US009309842B2

(12) United States Patent
Watson et al.

(10) Patent No.: US 9,309,842 B2
(45) Date of Patent: Apr. 12, 2016

(54) AIR INLET SILENCER FOR TURBOMACHINES

(71) Applicant: General Electric Company, Schenectady, NY (US)

(72) Inventors: Eric Tracy Watson, Houston, TX (US); Robert Allen Baten, Baytown, TX (US); Doyle Jackson Marrs, Milton, FL (US)

(73) Assignee: General Electric Company, Schenectady, NY (US)

(*) Notice: Subject to any disclaimer, the term of this patent is extended or adjusted under 35 U.S.C. 154(b) by 613 days.

(21) Appl. No.: 13/761,305

(22) Filed: Feb. 7, 2013

(65) Prior Publication Data

US 2014/0219781 A1 Aug. 7, 2014

(51) Int. Cl.
*F03D 11/00* (2006.01)
*F02M 35/12* (2006.01)
*F04D 29/66* (2006.01)

(52) U.S. Cl.
CPC ............. *F02M 35/12* (2013.01); *F04D 29/664* (2013.01); *F04D 29/665* (2013.01); *F04D 29/668* (2013.01)

(58) Field of Classification Search
CPC ... F04D 29/665; F04D 29/664; F04D 29/668; F04D 29/663; F05D 2260/963; F05D 2260/96; F02M 3/12; F02M 3/1216; F01N 1/10; F01N 1/12; F01N 1/125
USPC .................................................. 181/229, 267
See application file for complete search history.

(56) References Cited

U.S. PATENT DOCUMENTS

| | | | | |
|---|---|---|---|---|
| 2,720,935 | A * | 10/1955 | Lysholm | F01N 1/02 181/257 |
| 2,764,142 | A | 9/1956 | McMullen | |
| 2,789,662 | A | 4/1957 | McMullen | |
| 4,204,586 | A | 5/1980 | Hani et al. | |
| 5,140,819 | A | 8/1992 | Napier et al. | |
| 5,728,979 | A * | 3/1998 | Yazici | F24F 7/08 181/224 |
| 6,332,510 | B1 | 12/2001 | Frederiksen et al. | |
| 6,332,511 | B1 | 12/2001 | Parlato et al. | |
| 6,402,612 | B2 * | 6/2002 | Akhtar | F24F 7/007 181/224 |
| 6,419,576 | B1 | 7/2002 | Han | |
| 6,537,490 | B2 | 3/2003 | Han | |
| 6,672,424 | B2 * | 1/2004 | Gadefait | F02K 1/827 181/222 |
| 6,736,238 | B2 | 5/2004 | Kerr | |
| 2002/0050418 | A1 * | 5/2002 | Jenvey | F01N 1/24 181/224 |

* cited by examiner

*Primary Examiner* — Dwayne J White
*Assistant Examiner* — Jason Mikus
(74) *Attorney, Agent, or Firm* — Ernest G. Cusick; Hoffman Warnick LLC

(57) ABSTRACT

An air inlet silencer for turbomachines is provided. In one embodiment, the air inlet silencer includes a body, and a plurality of concentric baffles coupled to and axially surrounding the body. In another embodiment, an air inlet system for a turbomachine includes the air inlet silencer, as discussed herein, positioned within a silencer housing. The air inlet system may also include a deflector positioned within the silencer housing adjacent the air inlet silencer. In a further embodiment, a turbomachine includes a turbine coupled to a compressor, and an air inlet system, as described herein, coupled to the compressor.

18 Claims, 9 Drawing Sheets

AIR INLET SILENCER FOR TURBOMACHINES

BACKGROUND OF THE INVENTION

1. Technical Field

The disclosure is related generally to turbomachines. More particularly, the disclosure is related to an air inlet silencer for turbomachines.

2. Related Art

Conventional turbomachines, such as gas turbine systems, are utilized to generate power for electric generators. In general, conventional turbomachines generate power by passing a fluid (e.g., hot gas) through a compressor and a turbine component of the turbomachine. More specifically, fluid may flow through a fluid flow path for rotating a plurality of rotating buckets of the turbine component for generating the power. The fluid may be directed through the turbine component via the plurality of rotating buckets and a plurality of stationary nozzles positioned between the rotating buckets.

The fluid provided to the compressor component of conventional turbomachines enters the compressor component via an air inlet system. The air inlet system may include an air inlet duct for drawing inlet air into the air inlet system, a filtration system for preventing contaminates or debris (e.g., dust, sand) of the inlet air from entering the compressor component of the turbomachine, and a silencer system for minimizing the sound created by the turbomachine during operation. More specifically, the silencer system in conventional turbomachines may be utilized to provide sound attenuation for the turbomachine during operation, as well as aid in providing the fluid to the compressor component during operation of the turbomachine. By including a silencer system with acoustically absorptive properties, the silencer system may diminish sound emitted during operation of the turbomachine. In typical silencer systems, a silencer component and/or the silencer housing may be lined with a sound attenuating material or insulator for minimizing the sound.

However, by utilizing sound attenuating materials within the silencer system, the flow properties of the fluid may be negatively affected, resulting in a decrease of efficiency within the compressor component and ultimately a decrease in efficiency of the turbomachine. More specifically, as the fluid passes through the silencer system and over the sound attenuating materials, the fluid may experience changes in temperature, flow velocity, and/or flow pressure. Changes in the flow pathway may increase pressure loss in the fluid flow, and decrease the efficiency of the compressor component. One way of avoiding pressure loss in the fluid flow is to build a large air inlet system, and specifically a large silencer system, to allow the fluid to move freely through the air inlet system toward the compressor component. However, large air inlet systems may be costly to build and may limit the positioning of the turbomachine due to the size of the air inlet system.

BRIEF DESCRIPTION OF THE INVENTION

An air inlet silencer for turbomachines is disclosed. In one embodiment, the air inlet silencer includes: a body; and a plurality of concentric baffles coupled to and axially surrounding the body.

A first aspect of the invention includes an air inlet silencer for a turbomachine. The air inlet silencer having: a body; and a plurality of concentric baffles coupled to and axially surrounding the body.

A second aspect of the invention includes an air inlet system for a turbomachine. The air inlet system having: an air inlet silencer positioned within a silencer housing, the air inlet silencer including: a body; and a plurality of concentric baffles coupled to and axially surrounding the body; and a deflector positioned within the silencer housing adjacent the air inlet silencer.

A third aspect of the invention includes a turbomachine having: a compressor; a turbine component coupled to the compressor via a rotor shaft; and an air inlet system coupled to the compressor, the air inlet system including: an air inlet silencer positioned within a silencer housing coupled to the compressor, the air inlet silencer including: a body; and a plurality of concentric baffles coupled to and axially surrounding the body.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
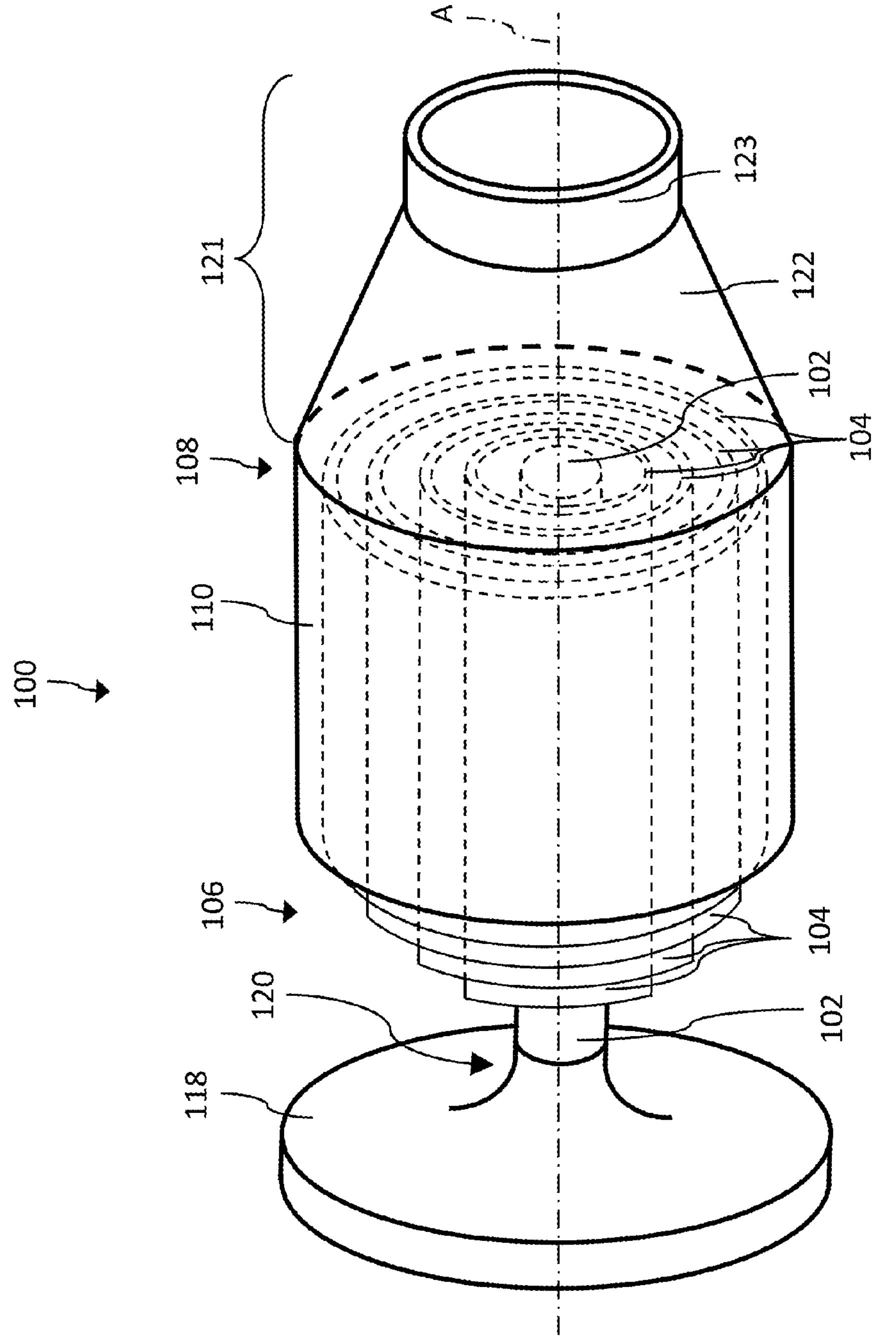
FIG. 1 shows a perspective view of an air inlet silencer including a body and a plurality of concentric baffles, according to embodiments of the invention.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As described herein, aspects of the invention relate to turbomachines. Specifically, as described herein, aspects of the invention relate to an air inlet silencer for turbomachines.

Turning to FIG. 1, a perspective view of an air inlet silencer is shown according to embodiments of the invention. Air inlet silencer 100, as shown in FIG. 1, may include a body 102 (shown in phantom) and a plurality of concentric baffles 104 (shown in phantom) coupled to and axially surrounding body 102. More specifically, as shown in FIG. 1, body 102 may include a cylindrical support member, and a plurality of concentric baffles 104 positioned around an axis (A) of body 102.

Figure 2:
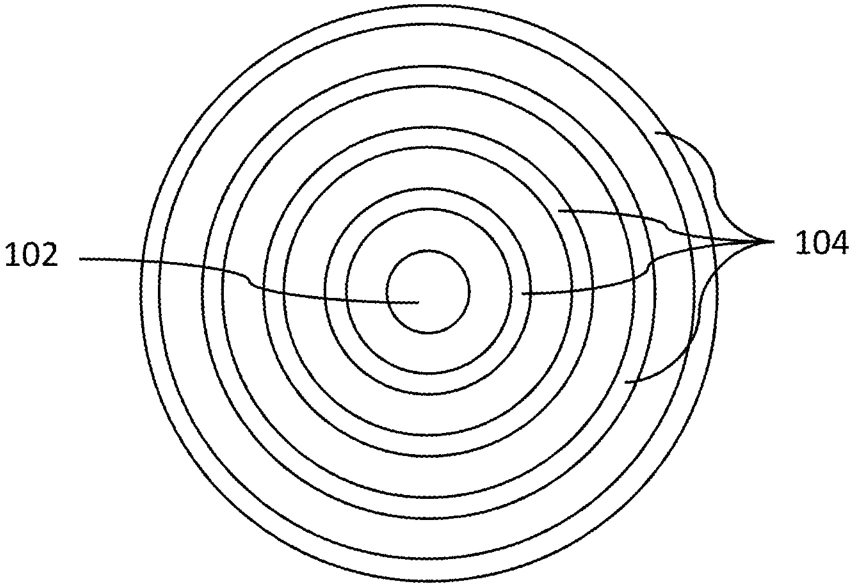
FIG. 2 shows a front view of a portion of an air inlet silencer including a body and a plurality of concentric baffles, according to embodiments of the invention.
Figure 3:
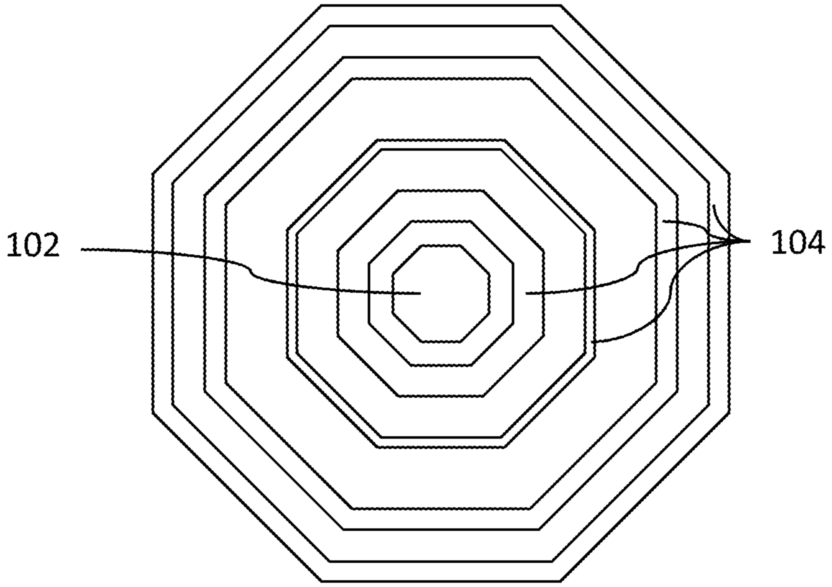
FIG. 3 shows a front view of a portion of an air inlet silencer including a body and a plurality of concentric baffles, according to an alternative embodiment of the invention.

Returning to FIG. 1, each of the plurality of concentric baffles 104 may axially surround body 102 for providing inlet air to a compressor (FIG. 8) of a turbomachine (FIG. 8), as discussed herein. Additionally, as discussed herein, the plurality of concentric baffles 104 may substantially attenuate sound created by a turbomachine (FIG. 8) utilizing air inlet silencer 100. As shown in FIGS. 1 and 2, each of the plurality of concentric baffles 104 may include a uniform thickness. That is, as shown in FIGS. 1 and 2, each of the plurality of concentric baffles 104 may be a substantially hollow cylinder having a thickness substantially similar to each of the other concentric baffles 104. Additionally, in an alternative embodiment as shown in FIG. 3, the plurality of concentric baffles 104 may be substantially polygonal. More specifically, as shown in FIG. 3, the plurality of concentric baffles 104 axially surrounding body 102 may be substantially octagonal. Additionally, as shown in FIG. 3, where the concentric baffles 104 may be substantially polygonal, body 102 may also be substantially polygonal (e.g., octagonal). Although body 102 and the plurality of concentric baffles 104 are shown as being either substantially cylindrical (e.g., FIGS. 1 and 2) or substantially polygonal (e.g., FIG. 3), it is understood that body 102 and the plurality of concentric baffles 104 may be configured as any combination of substantially cylindrical or substantially polygonal structures.

In an embodiment, as shown in FIGS. 1 and 2, each of the plurality of concentric baffles 104 of air inlet silencer 100 may be spaced a substantially equal distance apart radially. That is, as shown in FIGS. 1 and 2, each of the plurality of concentric baffles 104 may be spaced a substantially equal distance apart radially from one another and from body 102. In an alternative embodiment, as shown in FIG. 3, each of the plurality of concentric baffles 104 may be spaced apart by a varied distance. That is, as shown in FIG. 3, each of the plurality of concentric baffles 104 may be spaced apart at an unequal distance from one another.

Also shown in FIG. 1, each of the plurality of concentric baffles 104 may also include a first end 106 and a second end 108, opposite first end 106. In an embodiment, as shown in FIG. 1, first end 106 of each of the plurality of concentric baffles 104 may be stepped relative to one another. More specifically, as shown in FIG. 1, each of the plurality of concentric baffles 104 may vary in length, such that a second end 108 of each of the plurality of concentric baffles 104 may be axially aligned, and first end 106 of the plurality of concentric baffles 104 may be collectively stepped. As shown in FIG. 1, concentric baffle 104 positioned adjacent body 102 may include a length substantially longer than each of the other plurality of concentric baffles 104. Additionally, as shown in FIG. 1, concentric baffle 104 positioned furthest from body 102 may include a length substantially shorter than each of the other plurality of concentric baffles 104. In an alternative embodiment, not shown, the plurality of concentric baffles 104 may be aligned at both first end 106 and second end 108. That is, in an alternative embodiment, first end 106 of the plurality of concentric baffles 104 may not be stepped, and first end 106 and second end 108 may be substantially aligned within air inlet silencer 100.

In an embodiment, as shown in FIG. 1, air inlet silencer 100 may also include a casing 110 surrounding the plurality of concentric baffles 104 and body 102, respectively. More specifically, as shown in FIG. 1, casing 110 may substantially surround the plurality of concentric baffles 104 and body 102, respectively, such that first end 106 of each of the plurality of concentric baffles 104 are positioned outside of casing 110. Additionally, as shown in FIG. 1, second end 108 of each of the plurality of baffles 104 may be surrounded by casing 110.

Figure 4:
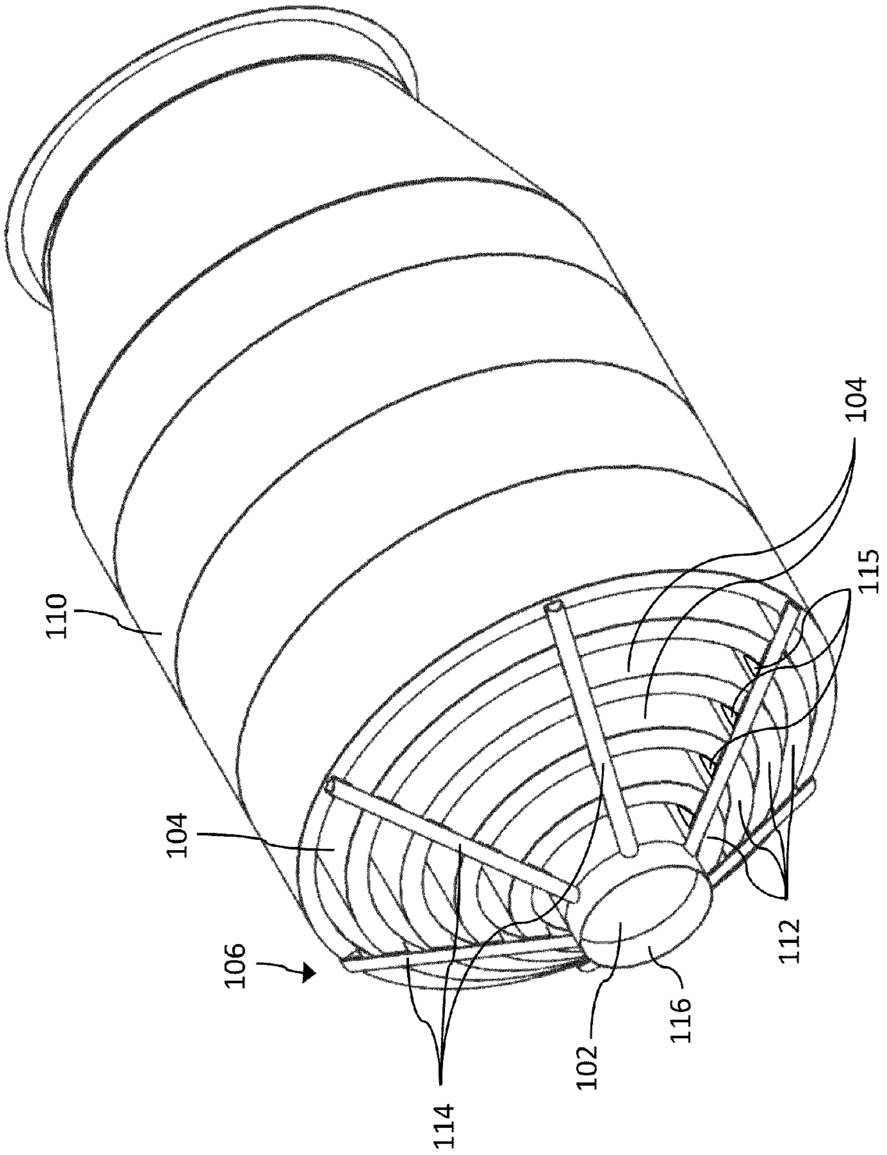
FIG. 4 shows a perspective view of a portion of an air inlet silencer including a plurality of concentric baffles and a plurality of struts, according to embodiments of the invention.
Figure 5:
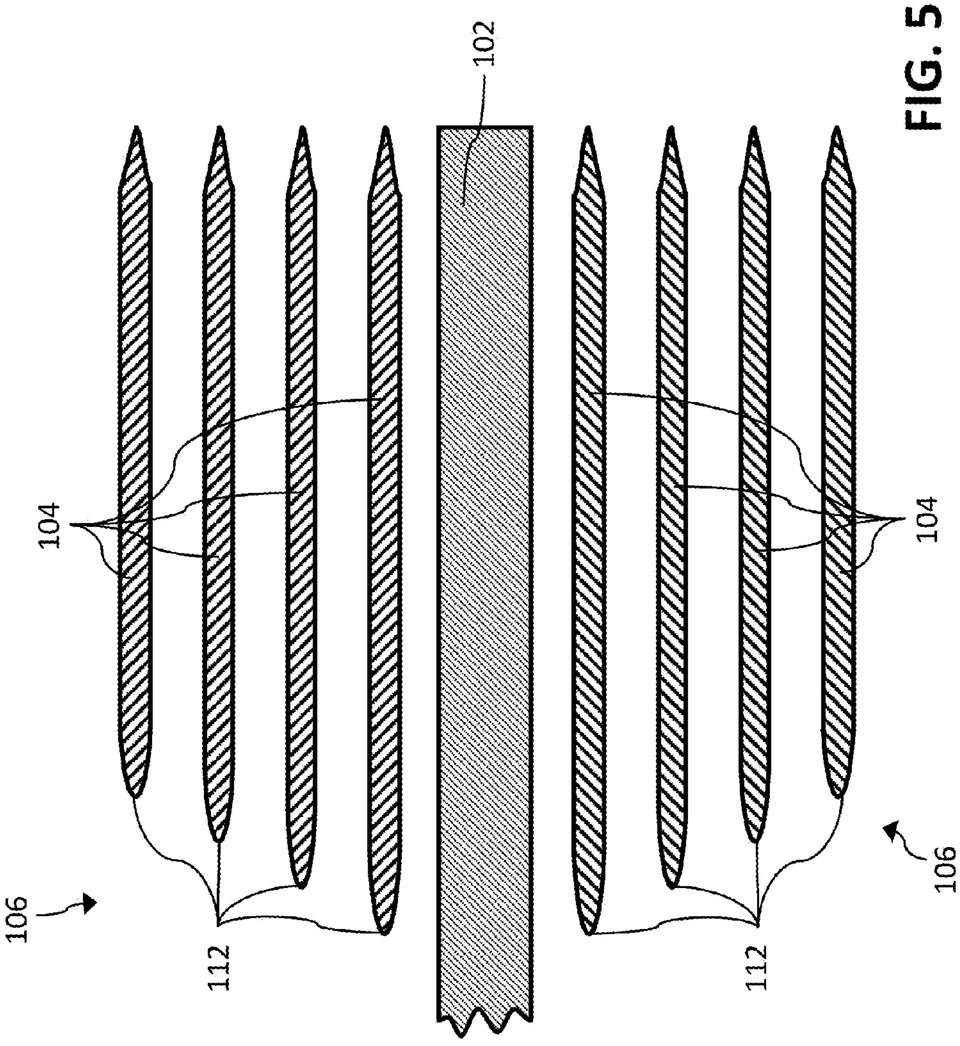
FIG. 5 shows a cross-sectional side view of a portion of an air inlet silencer including a body and a plurality of concentric baffles, according to embodiments of the invention.
Figure 6:
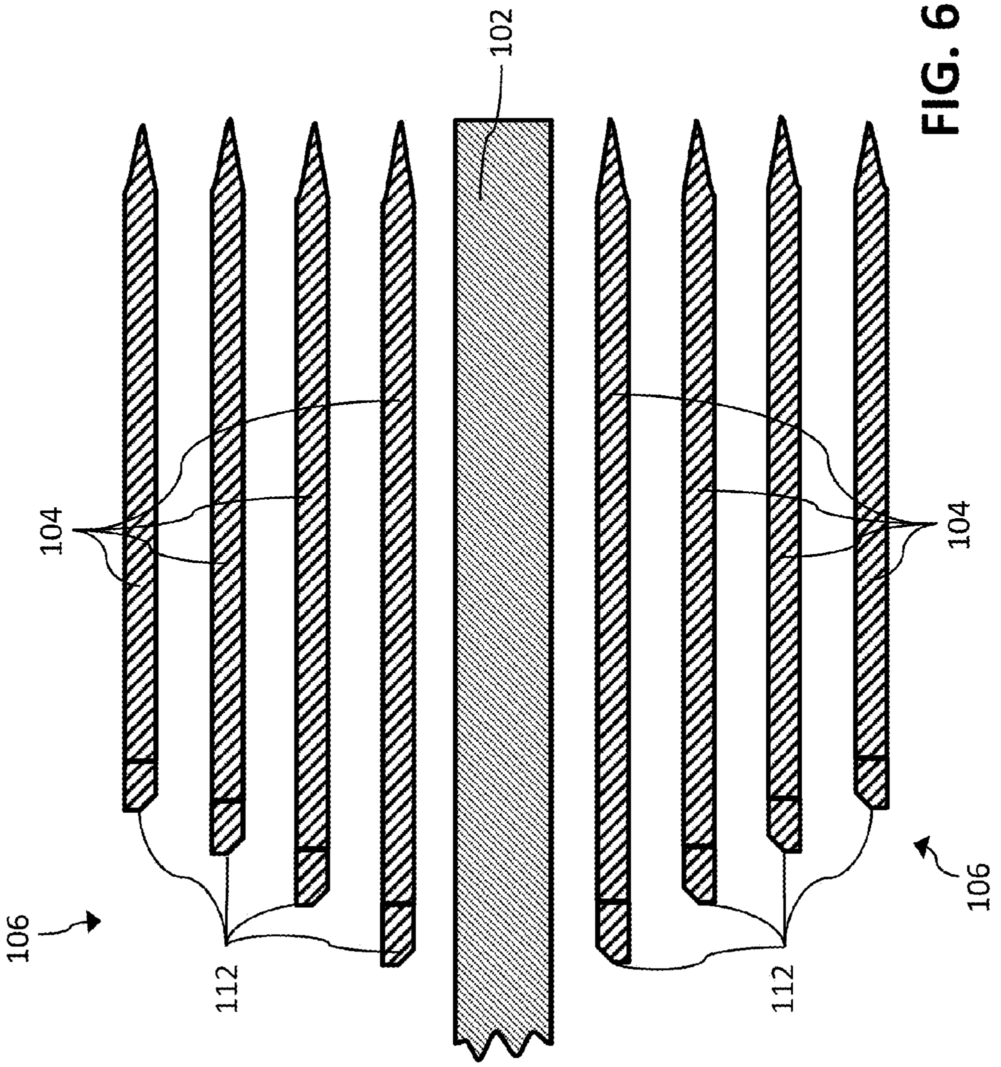
FIG. 6 shows a cross sectional side view of a portion of an air inlet silencer including a body and a plurality of concentric baffles, according to an alternative embodiment of the invention.

Briefly turning to FIGS. 4 and 5, air inlet silencer 100 is shown including first end 106 of the plurality of concentric baffles 104 according to an embodiment of the invention. As shown in FIGS. 4 and 5, first end 106 of each of the plurality of concentric baffles 104 may include a substantially rounded end 112. In an embodiment, as shown in FIGS. 4 and 5, substantially rounded end 112 may be perfectly circular. Substantially rounded ends 112 may divert inlet air flowing through air inlet silencer 100, such that the inlet air may flow around each of the plurality of concentric baffles 104 with minimal variation and gradual transitioning of flow velocity and/or minimal increase in flow pressure loss. That is, rounded ends 112 may prevent undesirable drag of the inlet air as it flows around first end 106 of each of the plurality of concentric baffles 104, which may substantially prevent a loss in flow velocity and/or flow pressure of the inlet air. In an alternative embodiment, not shown, first end 106 of each of the plurality of concentric baffles 104 may include a substantially tapered edge for allowing inlet air to flow over first end 106 and through air inlet silencer 100 with a minimal loss in flow velocity and/or flow pressure, as discussed herein. In an alternative embodiment, as shown in FIG. 6, first end 106 of each of the plurality of concentric baffles 104 may include a substantially angled or chamfered edge for allowing inlet air to flow over first end 106 and through air inlet silencer 100 with a minimal disturbance in flow velocity and/or flow pressure loss, as discussed herein. It is understood that each of the plurality of concentric baffles 104 may include a variety of substantially curved or rounded shapes to form first end 106 in order to allow inlet air to flow over first end 106 and through air inlet silencer 100 with a minimal loss in flow velocity and/or flow pressure, as discussed herein.

Returning to FIG. 4, air inlet silencer 100 may also include a plurality of struts 114 coupled to each of the plurality of concentric baffles 104 and casing 110, respectively. More specifically, as shown in FIG. 4, the plurality of struts 114 may be coupled to body 102 and first end 106 of each of the plurality of concentric baffles 104 for positioning each of the plurality of concentric baffles 104 to axially surround body 102. First end 106 of the plurality of concentric baffles 104 and casing 110 may be coupled to the plurality of struts 114 by any mechanical coupling technique including, but not limited, mechanical fasteners, welding, brazing, tying, etc. Additionally, the plurality of struts 114 may include a seat 115 for engaging first end 106 of each of the plurality of concentric baffles 104 and casing 110. Seat 115 positioned on each of the plurality of struts 114 may position each of the plurality of concentric baffles 104 and casing 110 to axially surround body 102 of air inlet silencer 100 without permanently coupling (e.g., welding, brazing) each of the plurality of concentric baffles 104 and casing 110 to struts 114. It is understood that seat 115 of struts 114 may be included within air inlet silencer 100 to provide additional support for positioning the plurality of concentric baffles 104 around body 102.

In an embodiment, as shown in FIG. 4, each of the plurality of struts 114 may be coupled to a support ring 116 coupled to body 102 of air inlet silencer 100. Support ring 116, including each of the plurality of struts 114, may be coupled to body 102 and may substantially provide each of the plurality of struts 114 to be coupled to and position the plurality of concentric baffles 104 within air inlet silencer 100. Support ring 116 may be coupled to body 102 by any conventional mechanical coupling technique now known or later developed. Additionally, support ring 116 may concentrically engage body 102 for providing the plurality of struts 114 to be coupled to first end 106 of each of the plurality of concentric baffles 104 and casing 110, respectively. In a further alternative embodiment, not shown, each of the plurality of struts 114 may be coupled directly to body 102 without support ring 116.

Returning to FIG. 1, air inlet silencer 100 may also include an air flow directing support 118 coupled to body 102. More specifically, as shown in FIG. 1, air flow directing support 118 may be coupled to body 102 adjacent first end 106 of each of the plurality of concentric baffles 104. Air flow directing support 118 may be coupled to body 102 by any conventional mechanical coupling technique now known or later developed. In an embodiment, air flow directing support 118 may include an inverted flared cone 120. As shown in FIG. 1, inverted flared cone 120 may be positioned adjacent first end 106 of each of the plurality of concentric baffles 104. As discussed herein, air flow directing support 118, and specifically inverted flared cone 120, may aid in directing inlet air through air inlet silencer 100.

Figure 7:
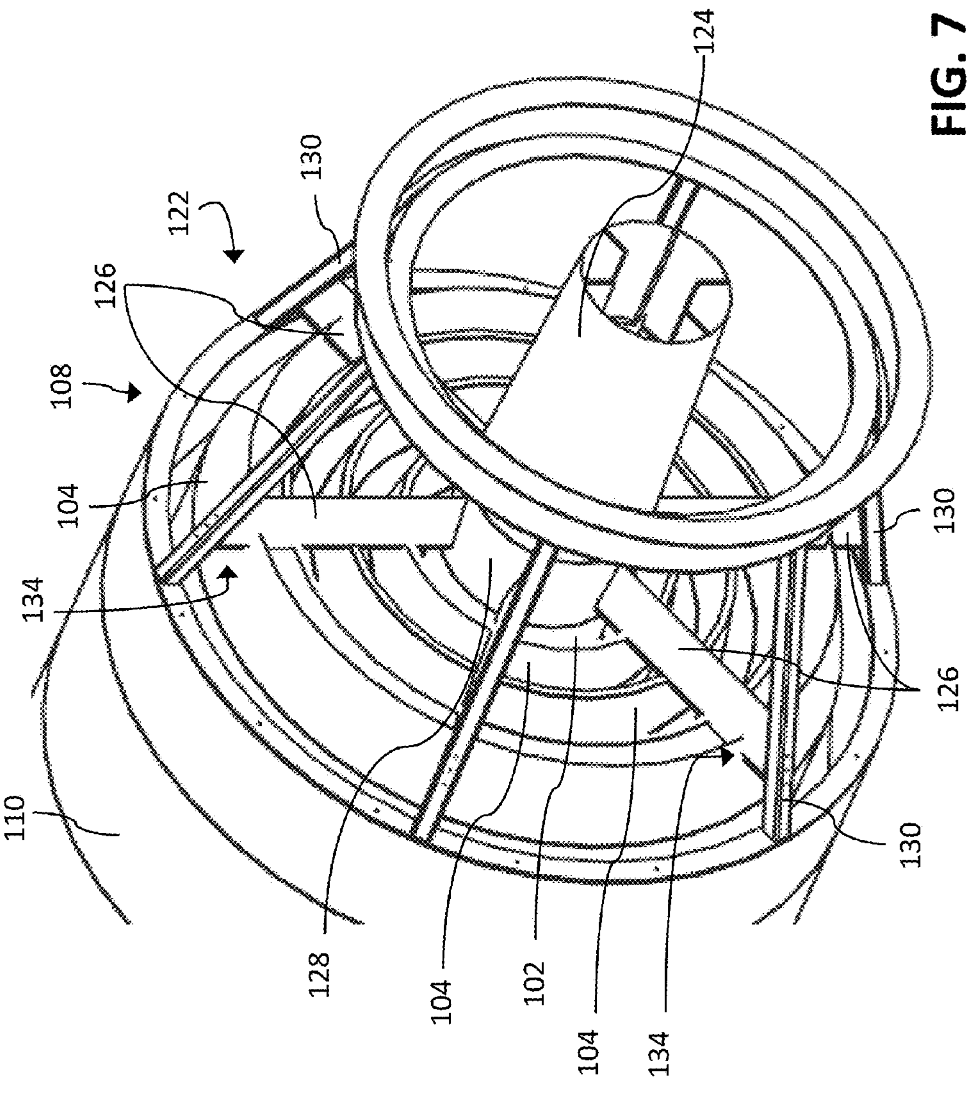
FIG. 7 shows a perspective view of a portion of an air inlet silencer including a transition component, according to embodiments of the invention.

Also shown in FIG. 1, air inlet silencer 100 may include a transition component 121 coupled to body 102. As shown in FIG. 1, transition component 121 may include a tapered portion 122 positioned adjacent second end 108 of air inlet silencer 100 and a cylindrical portion 123 positioned adjacent tapered portion 122, as discussed herein. As shown in FIG. 7, tapered portion 122 of transition component 121 (FIG. 1) may include a mount 124 concentrically coupled to body 102 of air inlet silencer 100, and a plurality of support members 126 coupled to mount 124. In one embodiment, mount 124 may have a cylindrical shape, but this is not necessary in all cases. As shown in FIG. 7, mount 124 may be coupled to body 102 adjacent second end 108 of the plurality of concentric baffles 104. More specifically, mount 124 may include a support component 128 coupled to body 102 adjacent second end 108 of the plurality of concentric baffles 104. Mount 124 may be coupled to body 102 by any conventional mechanical coupling technique now known or later developed. Support component 128 may also be concentrically positioned over a portion of body 102 and a portion of mount 124. That is, support component 128 may be positioned over the coupling interface (not shown) of body 102 and mount 124 to substantially couple transition component 121 to body 102 of air inlet silencer 100.

In an embodiment, as shown in FIG. 7, the plurality of support members 126 may be coupled to support component 128 of mount 124. More specifically, the plurality of support members 126 may be coupled to support component 128 of mount 124, and a support structure 130 of a tapered portion 122 of transition component 121. Each of the plurality of support members 126 may also engage a slot 134 formed on each of the plurality of concentric baffles 104. More specifically, as shown in FIG. 7, each of the plurality of support members 126 may engage slots 134 formed on second end 108 of each of the plurality of concentric baffles 104 for positioning the plurality of concentric baffles 104 within air inlet silencer 100. That is, the plurality of support members 126 may engage slots 134 to substantially prevent undesirable movement of the plurality of concentric baffles 104 during operation of a turbomachine (e.g., FIG. 8) utilizing air inlet silencer 100. However, it is understood that the plurality of support members 126 may engage slots 134 to allow acceptable movement of the plurality of concentric baffles 104 during operation of a turbomachine (e.g., FIG. 8) utilizing air inlet silencer 100. Acceptable movement may include, but is not limited to, movement of the concentric baffles 104 for allowing differential thermal growth effects of air inlet silencer 100, and the respective components (e.g., concentric baffles 104, support members 126, etc.).

As shown in FIG. 7, mount 124 and the plurality of support members 126 may be positioned within tapered portion 122 of transition component 121. Also, as shown in FIG. 7, tapered portion 122 may be coupled to casing 110 of air inlet silencer 100. More specifically, tapered portion 122 may be coupled to casing 110 adjacent second end 108 of the plurality of concentric baffles 104. Tapered portion 122 of transition component 121 may be coupled to casing 110 by any conventional mechanical coupling technique now known or later developed. As shown in FIG. 7, tapered portion 122 of transition component 121 may include a substantially frustoconical body shape. As discussed herein, transition component 121, and specifically tapered portion 122, may direct the inlet air to a compressor (e.g., FIGS. 8-10) of a turbomachine (e.g., FIG. 8). In an alternative embodiment, tapered portion 122 may include any conventional body shape including substantially tapered sidewalls to direct inlet air to a compressor (e.g., FIGS. 8-10), as discussed herein. In a further alternative embodiment where a compressor (e.g., FIGS. 8-10) may include a diameter substantially equal to the diameter of air inlet silencer 100, tapered portion 122 of transition component may include any conventional body shape to direct inlet air to a compressor (e.g., FIGS. 8-10), as discussed herein.

Figure 8:
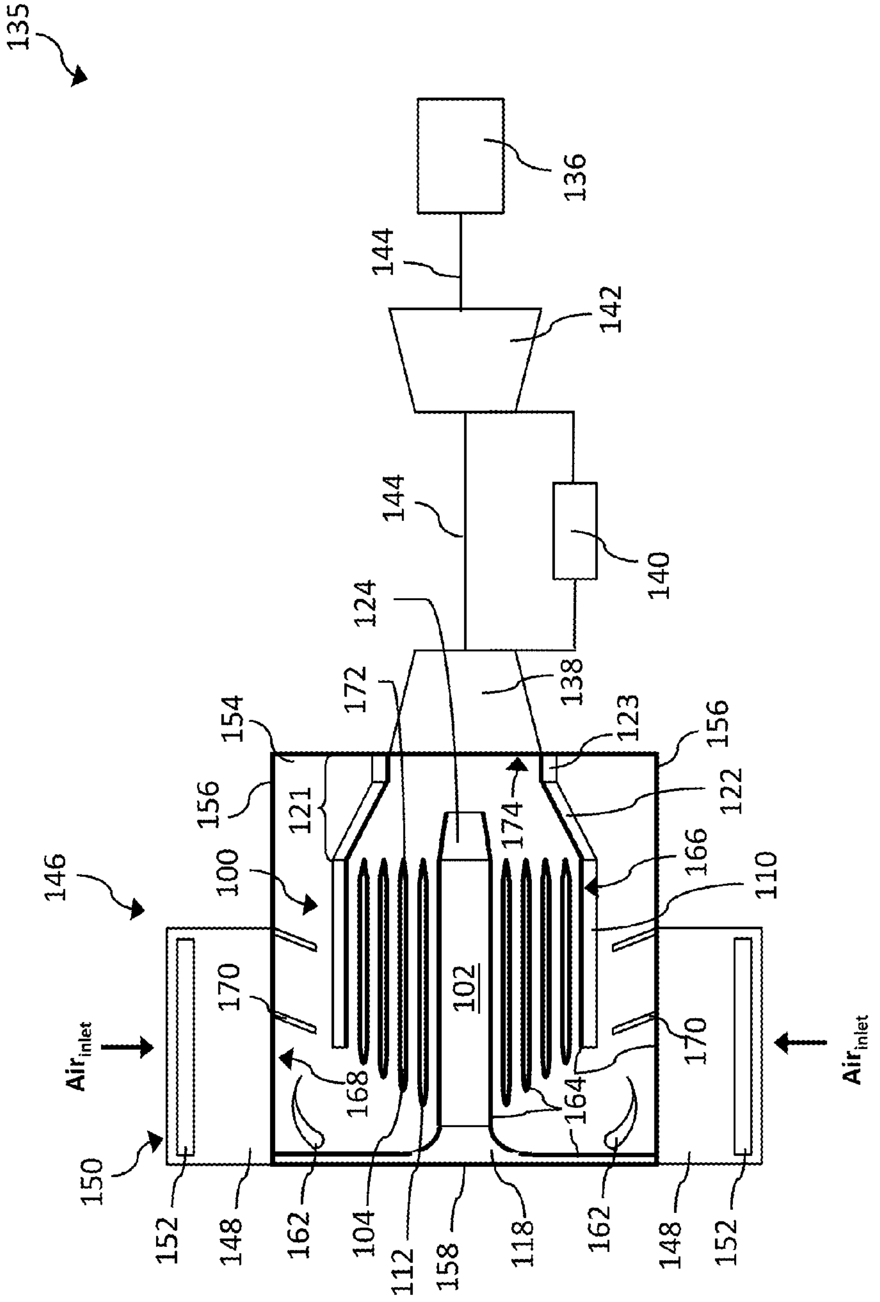
FIG. 8 shows a schematic top cross sectional view of a turbomachine including an air inlet system, according to embodiments of the invention.

Turning to FIG. 8, a schematic top cross sectional view of a turbomachine including an air inlet silencer system is shown, according to an embodiment of the invention. Turbomachine 135, as shown in FIG. 8 may be a conventional gas turbine system. However, it is understood that turbomachine 135 may be configured as any of a variety of conventional turbine system configured to generate power for an electric generator 136. As such, a brief description of the turbomachine 135 is provided for clarity. As shown in FIG. 8, turbomachine 135 may include a compressor 138, combustor 140 fluidly coupled to compressor 138 and a gas turbine component 142 fluidly coupled to combustor 140 for receiving a combustion product from combustor 140. Gas turbine component 142 may also be coupled to compressor 138 via a rotor shaft 144. Rotor shaft 144 may also be coupled to generator 136 for creating electricity during operation of turbomachine 135. In an alternative embodiment, not shown, rotor shaft 144 may be coupled to any conventional driven rotating equipment for transferring power by a rotating shaft during operation of turbomachine 135.

In an embodiment, as shown in FIG. 8, turbomachine 135 may also include an air inlet system 146 coupled to compressor 138. More specifically, as shown in FIG. 8, turbomachine 135 may include air inlet system 146 positioned in series, upstream of and coupled to compressor 138 of turbomachine 135. Air inlet system 146 may draw inlet air into air inlet system 146, and may provide the inlet air to compressor 138 to be utilized in turbomachine 135. As shown in FIG. 8, air inlet system 146 may include an air inlet duct 148. Air inlet duct 148 may draw the inlet air into opening 150 of air inlet duct 148 to provide the inlet air to compressor 138 of turbomachine 135. Air inlet duct 148 may include any now known or later developed air duct for conditioning and/or otherwise substantially delivering air to compressor 138 of turbomachine 135. Further description of air inlet duct 148 is omitted from the description for clarity.

As shown in FIG. 8 air inlet system 146 may also include a filter 152 positioned within air inlet duct 148. Filter 152 of air inlet duct 148 may be positioned adjacent opening 150 for removing debris (e.g., dust, sand, garbage, etc.) in the inlet air that may be drawn in by air inlet system 146 to be utilized by compressor 138 of turbomachine 135. Filter 152 may include any conventional air filter now known or later developed for substantially filtering debris from inlet air drawn into air inlet duct 148 via opening 150. Further description of filter 152 is omitted from the description for clarity.

Figure 9:
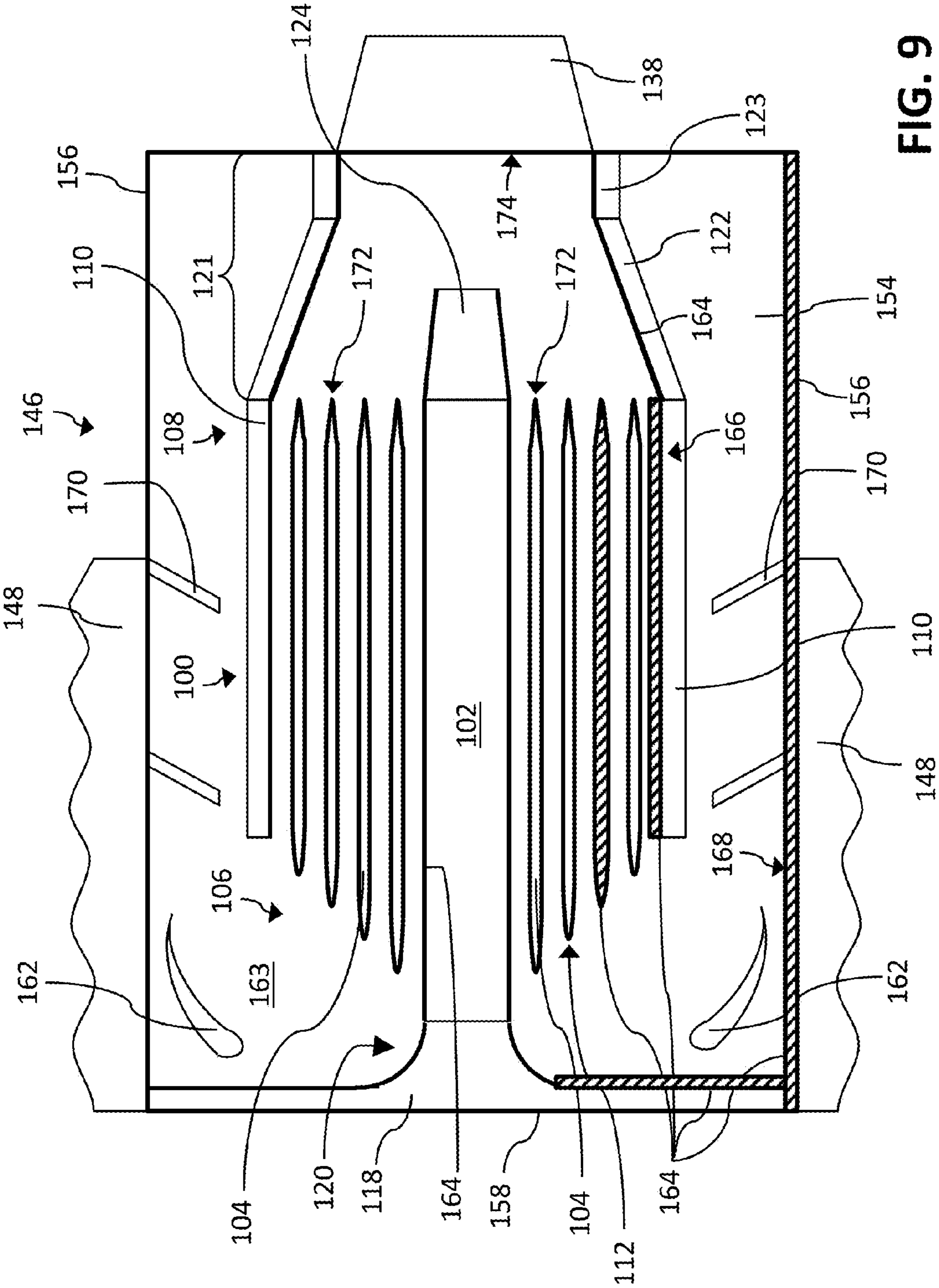
FIG. 9 shows a top cross sectional view of the air inlet system including an air inlet silencer as shown in FIG. 8, according to embodiments of the invention.

Air inlet system 146 may also include an air inlet silencer housing 154 coupled to air inlet duct 148. More specifically, as shown in FIGS. 8 and 9, air inlet system 146 may include air inlet ducts 148 coupled to opposite sidewalls 156 of silencer housing 154 and silencer housing 154 may be coupled to compressor 138 of turbomachine 135. As shown in FIGS. 8 and 9, air inlet silencer 100 according to embodiments of the invention may be positioned within silencer housing 154. More specifically, as shown in FIGS. 8 and 9, casing 110 of air inlet silencer 100 may be positioned substantially adjacent sidewall 156 of silencer housing 154. As shown in FIGS. 8 and 9, air flow directing support 118 of air inlet silencer 100 may be coupled to an endwall 158 of silencer housing 154. Additionally, as shown in FIGS. 8 and 9, transition component 121 of air inlet silencer 100 may be coupled to compressor 138 of turbomachine 135. More specifically, a cylindrical portion 123, adjacent the tapered portion 122, of transition component 121 may be coupled to compressor 138 for providing the inlet air to turbomachine 135. Cylindrical portion 123 of transition component 121 may be coupled to compressor 138 by any conventional mechanical coupling technique now known or later developed for preventing inlet air from leaking from silencer housing 154 and/or turbomachine 135.

As shown in FIGS. 8 and 9, air inlet system 146 may also include a deflector 162 positioned within silencer housing 154 adjacent air inlet silencer 100. More specifically, as shown in FIGS. 8 and 9, air inlet system 146 may include a plurality of deflectors 162 positioned adjacent air flow directing support 118, on opposite sides of air inlet silencer 100. Deflector 162 may be positioned substantially between a floor portion 163 (FIG. 9) and roof portion (not shown) of silencer housing 154 for substantially redirecting inlet air flowing into silencer housing 154 toward air inlet silencer 100. That is, deflector 162 may aid in directing inlet air toward air flow directing support 118, and specifically inverted flared cone 120 of air flow directing support 118, which may further direct the inlet air through air inlet silencer 100, as discussed herein.

In an embodiment, as shown in FIGS. 8 and 9, air inlet system 146 may also include acoustic liner layers 164 for substantially attenuating sound created by turbomachine 135 during operation, as discussed herein. As shown in FIGS. 8 and 9, casing 110 of air inlet silencer 100 may include acoustic liner layer 164 positioned on an interior surface 166 of casing 110. Additionally, as shown in FIGS. 8 and 9, body 102, each of the plurality of concentric baffles 104, air flow directing support 118, and/or transition component 121, including mount 124, may include acoustic liner layers 164. More specifically, components (e.g., body 102, the plurality of concentric baffles 104, etc.) of air inlet silencer 100 may include acoustic liner layers 164 substantially covering a surface in which inlet air may flow over before flowing into compressor 138 of turbomachine 135. In an embodiment, as shown in FIGS. 8 and 9, silencer housing 154 may also include acoustic liner layer 164 positioned on an interior surface 168 of silencer housing 154. Acoustic liner layer 164 of air inlet system 146 may include any conventional liner layer material for attenuating sound including, but not limited to: high density foam, insulated vinyl, acoustic boards, etc.

Figure 10:
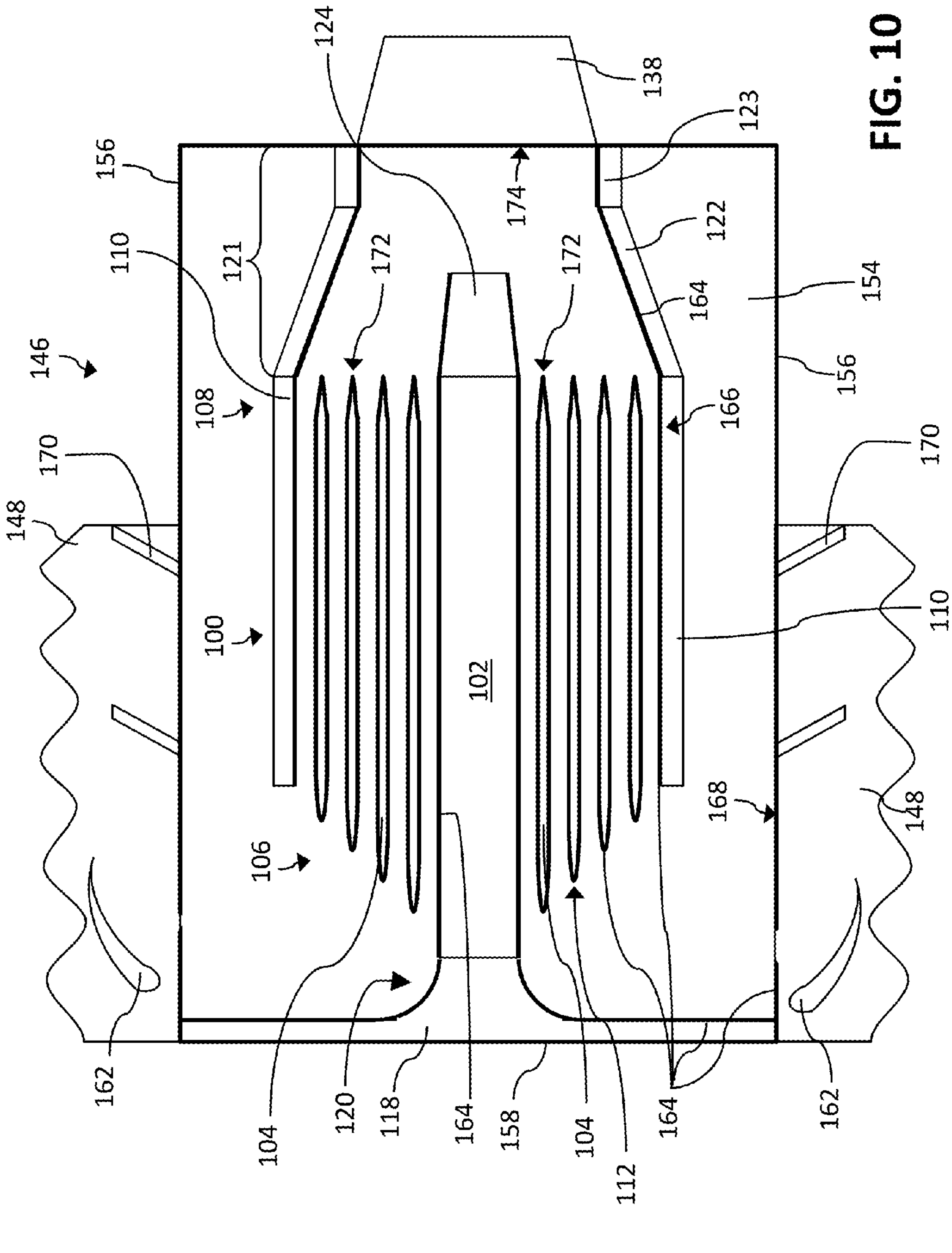
FIG. 10 shows a top cross sectional view of an air inlet system including an air inlet silencer, according to an alternative embodiment of the invention.

A process of operation of inlet air to compressor 138 may now be briefly described with reference to FIGS. 8 and 9. As discussed herein, air inlet duct 148 of air inlet system 146 may draw inlet air in via opening 150. Once the inlet air is drawn into air inlet duct 148, the inlet air may be filtered by filter 152 to remove any debris or contaminates included in the inlet air that may damage compressor 138. After the inlet air is filtered, the inlet air may move through air inlet duct 148 and may flow into silencer housing 154 coupled to air inlet duct 148. More specifically, the inlet air may flow through air inlet duct 148 and may be substantially directed toward endwall 158 of silencer housing 154 and/or air flow directing support 118 of air inlet silencer 100. To aid in directing the inlet air within silencer housing 154, air inlet duct 148 may include inlet air directors 170 positioned within silencer housing 154. As shown in FIGS. 8 and 9, inlet air directors 170 may be substantially angled toward endwall 158 of silencer housing 154 to aid in directing the inlet air into silencer housing 154. In an alternative embodiment, as shown in FIG. 10, inlet air directors 170 and/or air deflectors 162 may be positioned within inlet air duct 148, upstream of, and adjacent to, inlet silencer housing 154. That is, as shown in FIG. 10, both inlet air directors 170 and air deflectors 162 may be positioned in one of: the inlet silencer housing 154, inlet air duct 148, or any combination of the two components of air inlet system 146.

Returning to FIGS. 8 and 9, after the inlet air enters silencer housing 154, the inlet air may flow through air inlet silencer 100 positioned within silencer housing 154 toward compressor 138 of turbomachine 135. More specifically, the inlet air may flow toward endwall 158 of silencer housing 154 and air flow directing support 118 of air inlet silencer 100, and may be substantially directed through the plurality of concentric baffles 104 of air inlet silencer 100. As discussed herein, deflector 162 of air inlet system 146 may aid in redirecting the inlet air toward inverted flared cone 120 of air flow directing support 118 to ensure the inlet air may flow through inlet air silencer 100 to compressor 138. Air flow directing support 118 of air inlet silencer 100 may direct the inlet air toward first end 106 of the plurality of concentric baffles 104, such that the inlet air may flow between body 102, the plurality of concentric baffles 104 and casing 110 of air inlet silencer 100. As discussed herein, rounded end 112 of each of the plurality of concentric baffles 104 may prevent a substantial disturbance in flow velocity and/or flow pressure loss increase in the inlet air as the inlet air flows through air inlet silencer 100.

The inlet air may flow from first end 106 to second end 108 of the plurality of concentric baffles 104 as the inlet air moves toward compressor 138. As the inlet air reaches second end 108 of the plurality of concentric baffles 104 the flow path of the inlet air may converge on compressor 138. More specifically, as shown in FIGS. 8 and 9, second end 108 of each of the plurality of concentric baffles 104 may include a substantially tapered end 172 for allowing inlet air to be directed toward compressor 138 which may include an opening 174 having a diameter substantially smaller than the diameter of air inlet silencer 100. That is, substantially tapered end 172 of each of the plurality of concentric baffles 104 may aid in narrowing the flow path of the inlet air as it flows toward compressor 138. Additionally, as the inlet air reaches transition component 121, the flow path of the inlet air may be narrowed by tapered portion 122 of transition component 121. As such, once the inlet air reaches cylindrical portion 123 of transition component 121 the inlet air may substantially flow directly into opening 174 of compressor 138 with no further directional conversion or narrowing of the flow path of the inlet air.

As discussed herein, and compared to conventional turbomachine silencers, air inlet silencer 100 may substantially attenuate sound generated by turbomachine 135 while also maintaining and/or avoiding a decrease in flow velocity and/or flow pressure of the inlet air being provided to compressor 138. Additionally, as a result of the configuration of air inlet silencer 100 and its respective components (e.g., body 102, the plurality of concentric baffles 104, etc.) air inlet silencer 100 may be substantially smaller in size compared to conventional turbomachine silencers. As a result, silencer housing 154 and air inlet system 146 may be smaller in size compared to conventional air inlet systems utilized by turbomachines. Thus, the overall size of turbomachine 135 may be decreased by utilizing air inlet system 146 including air inlet silencer 100.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An air inlet silencer for a turbomachine, the air inlet silencer comprising:
- a body;
- a plurality of concentric baffles coupled to and axially surrounding the body; and
- a transition component coupled to the body, the transition component for directing airflow to a compressor of the turbomachine and including:
  - a mounting cylinder concentrically coupled to the body; and
  - a plurality of support members coupled to the mounting cylinder.

2. The air inlet silencer of claim 1, wherein each of the plurality of concentric baffles include a first end and a second end.

3. The air inlet silencer of claim 2, wherein the first end of each of the plurality of concentric baffles includes a substantially rounded end.

4. The air inlet silencer of claim 2, wherein the first ends of the plurality of concentric baffles are stepped relative to one another.

5. The air inlet silencer of claim 2, wherein the second end of each of the plurality of concentric baffles includes a substantially tapered end.

6. The air inlet silencer of claim 1, further comprising a casing surrounding the plurality of concentric baffles, the casing including an acoustic liner layer positioned on an interior surface of the casing.

7. The air inlet silencer of claim 1, wherein each of the plurality of concentric baffles includes an acoustic liner layer.

8. The air inlet silencer of claim 1, further comprising an air flow directing support coupled to the body, the air flow directing support including an inverted flared cone for directing air along the body.

9. The air inlet silencer of claim 8, wherein the air flow directing support includes an acoustic liner layer.

10. The air inlet silencer of claim 1, wherein each of the plurality of support members of the transition component engages a slot formed on each of the plurality of concentric baffles.

11. The air inlet silencer of claim 1, further comprising a plurality of struts coupled to each of the plurality of concentric baffles.

12. The air inlet silencer of claim 1, wherein the body and the plurality of concentric baffles are positioned within a silencer housing and adjacent a deflector of the turbomachine.

13. An air inlet system for a turbomachine, the air inlet system comprising:
- an air inlet silencer positioned within a silencer housing, the air inlet silencer including:
  - a body;
  - a plurality of concentric baffles coupled to and axially surrounding the body; and
  - a transition component coupled to the body, the transition component for directing airflow to a compressor of the turbomachine and including:
    - a mounting cylinder concentrically coupled to the body; and
    - a plurality of support members coupled to the mounting cylinder; and
- a deflector positioned within the silencer housing adjacent the air inlet silencer.

14. The air inlet system of claim 13, wherein each of the plurality of concentric baffles of the air inlet silencer include:
- a substantially rounded first end; and
- a substantially tapered second end opposite the substantially rounded first end.

15. The air inlet system of claim 14, wherein the substantially rounded first ends of the plurality of concentric baffles of the air inlet silencer are stepped relative to one another.

16. The air inlet system of claim 13, wherein the air inlet silencer further includes a casing surrounding the plurality of concentric baffles, the casing positioned adjacent a sidewall of the silencer housing.

17. The air inlet system of claim 13, wherein the air inlet silencer further includes an air flow directing support coupled to the body of the air inlet silencer and an endwall of the silencer housing, the air flow directing support including an inverted flared cone for directing air through the silencer housing.

18. A turbomachine comprising:
- a compressor;
- a turbine component coupled to the compressor via a rotor shaft; and
- an air inlet system coupled to the compressor, the air inlet system including:
  - an air inlet silencer positioned within a silencer housing coupled to the compressor, the air inlet silencer including:
    - a body;

a plurality of concentric baffles coupled to and axially surrounding the body; and a transition component coupled to the body, the transition component for directing airflow to a compressor of the turbomachine and including:

a mounting cylinder concentrically coupled to the body; and a plurality of support members coupled to the mounting cylinder.

* * * * *